(12) United States Patent
Fang et al.

(10) Patent No.: US 9,100,746 B2
(45) Date of Patent: Aug. 4, 2015

(54) MOBILE TERMINAL HANDWRITING PEN

(75) Inventors: Wen Fang, Shenzhen (CN); Sha Cao, Shenzhen (CN)

(73) Assignee: ZTE Corporation (CN)

( * ) Notice: Subject to any disclaimer, the term of this patent is extended or adjusted under 35 U.S.C. 154(b) by 139 days.

(21) Appl. No.: 13/985,410

(22) PCT Filed: Jun. 2, 2011

(86) PCT No.: PCT/CN2011/075226
§ 371 (c)(1),
(2), (4) Date: Sep. 30, 2013

(87) PCT Pub. No.: WO2012/109828
PCT Pub. Date: Aug. 23, 2012

(65) Prior Publication Data
US 2014/0016811 A1      Jan. 16, 2014

(30) Foreign Application Priority Data

Feb. 14, 2011   (CN) ...................... 2011 2 0038018 U

(51) Int. Cl.
*H04R 1/02*    (2006.01)
*H04R 1/10*    (2006.01)
(Continued)

(52) U.S. Cl.
CPC ............... *H04R 1/105* (2013.01); *G06F 3/039* (2013.01); *G06F 3/03545* (2013.01)

(58) Field of Classification Search
CPC .. H04R 1/1075; H04R 5/033; H04R 2420/09; H04S 7/304; H06F 3/039; H06F 3/3545
USPC ............. 381/74, 334, 68, 309, 311, 380, 384; 455/90, 66, 74, 350; 379/433.02
See application file for complete search history.

(56) References Cited

U.S. PATENT DOCUMENTS

| 7,570,253 B2 | 8/2009 | Huang |
| 8,165,398 B2 | 4/2012 | De Haan |

(Continued)

FOREIGN PATENT DOCUMENTS

| CN | 201266932 Y | 7/2009 |
| CN | 201550147 U | 8/2010 |

(Continued)

OTHER PUBLICATIONS

International Preliminary Examination Report in Chinese issued Aug. 21, 2013 with English language translation in International Application No. PCT/CN2011/075226.
Written Opinion of the ISA in Chinese mailed Nov. 17, 2011 with English language translation in International Application No. PCT/CN2011/075226.
International Search Report mailed Nov. 17, 2011 in International Application No. PCT/CN2011075226.

*Primary Examiner* — Vivian Chin
*Assistant Examiner* — Ammar Hamid
(74) *Attorney, Agent, or Firm* — Plumsea Law Group, LLC

(57) ABSTRACT

A mobile terminal handwriting pen is provided, and the handwriting pen is integrated with an earphone. The handwriting pen includes: a pen nib, which is an earphone plug; a pen body, one end of which is fixedly connected to the pen nib, and the other end is movably connected to a pen cap, wherein, an earphone cord is set within the pen body, and both ends of the earphone cord are respectively connected with the earphone plug and an earplug; and the pen cap, which movably cooperates and connects with the pen body and on which the earplug is set. The present invention has a simple structure and less production cost, and it is easy to be standardized and massively produced, which is convenient for usage and promotion.

8 Claims, 1 Drawing Sheet

(51) Int. Cl.
*G06F 3/039* (2013.01)
*G06F 3/0354* (2013.01)
*H04R 9/06* (2006.01)

(56) References Cited

U.S. PATENT DOCUMENTS 8,248,372 B2    8/2012  Saila

| | | | |
|---|---|---|---|
| 2003/0068062 A1* | 4/2003 | Huang | 381/384 |
| 2007/0205996 A1* | 9/2007 | Huang | 345/179 |
| 2008/0231614 A1* | 9/2008 | Huang et al. | 345/179 |

FOREIGN PATENT DOCUMENTS

| CN | 201601210 U | 10/2010 |
|---|---|---|
| CN | 201841799 U | 5/2011 |
| JP | 2001-125742 A | 5/2001 |
| WO | WO/2012/012971 | 2/2012 |

* cited by examiner

MOBILE TERMINAL HANDWRITING PEN

TECHNICAL FIELD

The invention relates to a mobile terminal handwriting pen.

BACKGROUND OF THE RELATED ART

With the universal popularity of the large touch-screen mobile phones, user demands for handwriting pen are also growing, meanwhile, the functional requirements for the handwriting pen is also becoming more diverse.

In public places, in order not to disturb other people, users often need to wear an earphone to use the phone's entertainment functions such as audio and video. However, the earphone must be carried separately from the phone due to its shape, and many users do not want to have the trouble of carrying an extra earphone, resulting in the earphone randomly placed due to the lack of use in a long term, and the user cannot find it when needed. The inventors of the invention find out that: if the earphone can be set into a portable structure integrated with the phone, it can objectively improve the phone's production costs and reduce the economic benefits of the business.

SUMMARY OF THE INVENTION

The invention provides a mobile terminal handwriting pen to solve the problem of how to provide a mobile terminal handwriting pen that is integrated with an earphone and has a simple structure.

In order to solve the above-mentioned problem, the invention provides a mobile terminal handwriting pen that is integrated with an earphone, and said handwriting pen comprises:

a pen nib, which is an earphone plug;

a pen body, one end of which is fixedly connected with said pen nib, and the other end of which is movably connected with a pen cap, and there is an earphone cord in said pen body, and both ends of said earphone cord are respectively connected with said earphone plug and earplugs; and a pen cap, which movably cooperates and connects with said pen body, and there are earplugs disposed on said pen cap.

In said handwriting pen provided in the present invention, there is a matched winding structure connected and configured within the pen body for winding said earphone cord.

In said handwriting pen provided in the present invention, said winding structure comprises:

a rotary base, which is rotatable connected with said pen body; and a rotary screw shaft, which is disposed in said pen body, and one end of said rotary screw shaft is connected with said rotary base and wound around said earphone cord through threads.

In said handwriting pen provided in the present invention, said rotary base is disposed in said pen body and connected to the end near said pen nib.

In said handwriting pen provided in the present invention, it is a plugged connection between said pen cap and said pen body.

In said handwriting pen provided in the present invention, said pen body is an enclosed penholder.

In said handwriting pen provided in the present invention, said pen cap is connected to said rotary screw shaft, and said rotary screw shaft is connected with said rotary base through threads, and said earphone cord is wound around said rotary screw shaft by rotating said pen cap, the assembly and disassembly between said pen cap and said pen body can be achieved when achieving the assembly and disassembly between said rotary screw shaft and said rotary base.

In said handwriting pen provided in the present invention, the winding structure is used to tightly connect said earplugs to said winding structure.

In said handwriting pen provided in the present invention, it is an opening at the location where said pen body is near said pen cap, and said pen cap is provided with a step, the dimension of whose outer circumference matches with the size of inner wall of said opening so as to achieve the tight fit.

In said handwriting pen provided in the present invention, said mobile terminal is a mobile phone.

The present invention has the following advantages:

1. said pen nib in the present invention is an earphone plug, and earplugs are disposed on said pen cap, the earphone cord is set within said pen body, which can achieve not only the function of mobile terminal handwriting pen, but also the earphone function, and it is easy to be carried and has a simple structure, which does not increase the phone's production costs and has beautiful appearance.

2. said pen body in the present invention uses the winding structure, which can easily wind the earphone cord to avoid the earphone cord messily wrapped within said pen body and hence the occurrence of fracture. In addition, the use of the winding structure can closely connect said earplugs to the structure so as to form a certain tension, thus it prevents accidental removal of said pen cap from said pen body and plays the role of fixing said pen cap.

3. the present invention has a simple structure, low production cost, and can be easily standardized and massively produced, and it is easy for usage and promotion.

PREFERRED EMBODIMENTS OF THE INVENTION

To make objectives, technical solutions and advantages of the present invention more apparent, embodiments of the present invention are described in detail hereinafter with combination of the accompanying drawings. It should be noted that, in case of no conflict, the embodiments and features of the embodiments in the present application could be combined randomly with each other.

The handwriting pen provided in the present invention is applicable to mobile terminals such as mobile phones, and this embodiment will be described by taking the mobile phone as an example, and it should be noted that the handwriting pen in the present invention is not limited to the application in mobile phones.

Figure 1:
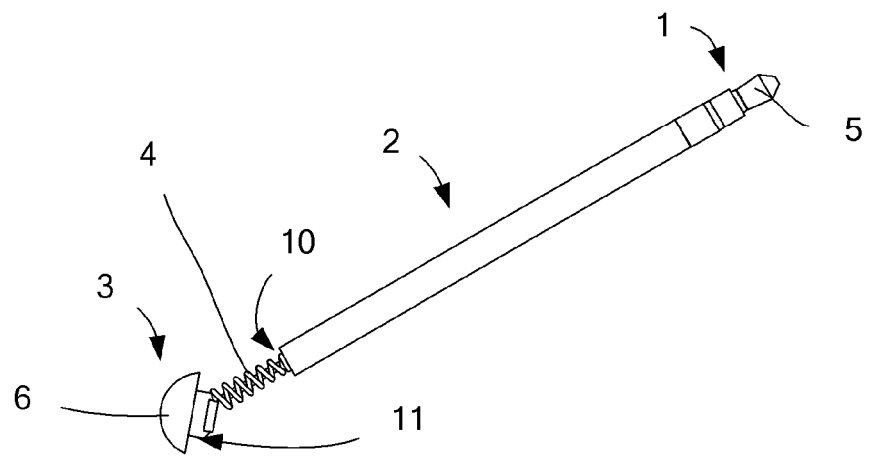
FIG. 1 is a schematic diagram of the structure of a cell phone handwriting pen integrated with earphone in accordance with the present invention.

As shown in FIG. 1, a mobile terminal handwriting pen in accordance with an embodiment of the present invention comprises: pen nib 1, pen body 2 and pen cap 3. Wherein, said pen nib 1 is used to write on a touch screen, and said pen body 2 is easy to be held by a user, and said pen cap 3 is used to enclose said pen body 2 and for the beautiful appearance of the handwriting pen.

Said pen nib 1 is the earphone plug 5. The audio can be obtained through the earphone plug 5, the outer layer of the earphone plug 5 is metal, and it can be directly used as said pen nib 1 of the handwriting pen, that is, the earphone plug 5 can be used directly to perform handwriting input on the mobile phone touch screen.

One end of said pen body 2 is fixedly connected with said pen nib 1, and the other end is movably connected with said pen cap 3. The length and thickness of the pen body 2 are designed to be easily grabbed and carried. The shape of said pen body 2 is generally cylindrical, polygonal columnar and so on, and the material of said pen body 2 can be metal or plastic. Said pen body 2 is provided with earphone cord 4, both ends of which are respectively connected with said earphone plug 5 and earplug 6. The length of said earphone cord 4 is greater than the length of said pen body 2, and said earphone cord 4 can be wrapped and stored inside said pen body 2, and can be pulled out when used.

Said pen cap 3 movably cooperate and connect with said pen body 2, and it can be integrated with said pen body 2 and can also be easily removed from said pen body 2 and used alone. Said earplug 6 is disposed on said ear cap 3 and is the same as other earplugs in order to be fit into a human ear. A connection structure is set on said earplug 6 to facilitate the quick connection with said pen body 2.

In the embodiment of the present invention, said pen nib 1 is the earphone plug 5, said earplug 6 is disposed on said pen cap 3, and said earphone cord 4 is provided inside said pen body 2, which can achieve not only the mobile phone handwriting pen function, but also the earphone function, and it is easy to be carried and has a simple structure, which does not increase the phone's production costs and has beautiful appearance.

Figure 2:
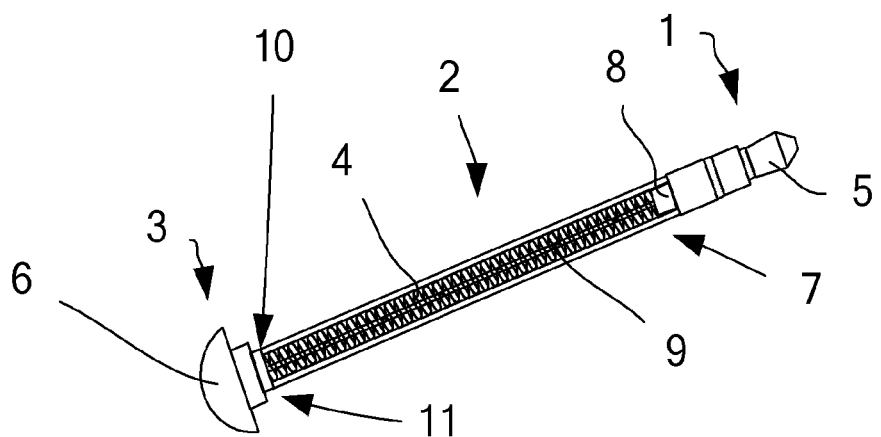
FIG. 2 is a schematic diagram of the sectional structure of a cell phone handwriting pen integrated with earphone in accordance with the present invention.

As shown in FIG. 2, in the embodiment of the present invention, said pen body 2 is connected and provided with a matched winding structure 7 to be wound around said earphone cord 4. Said winding structure 7 comprises the rotary base 8 and the rotary screw shaft 9, wherein, the rotary base 8 can be rotatable connected with said pen body 2; said rotary screw shaft 9 is provided within said pen body 2, and one end of said rotary screw shaft 9 is connected with said rotary base 8 and wound around said earphone cord 4 through said thread.

The outer part of said rotary base 8 can be exposed to the outside of said pen body 2, and directly rotating the rotary base 8 can easily drive said rotary screw shaft 9 to rotate, and since the rotary screw shaft 9 is with threads, when the rotary screw shaft 9 rotates, said earphone cord 4 can wind easily along said thread to avoid intertwined. Said rotary base 8 can also be wrapped and covered completely inside said pen body 2, and said rotary base 8 is driven to rotate through rotating said pen body 2, so as to drive said rotary screw shaft 9 to rotate.

In the embodiment of the present invention, said rotating base 8 is set and connected to the end of said pen body 2 that is close to said pen nib, therefore, the weight of the handwriting pen focuses near said pen nib 1, which is helpful to write. In addition, said rotary base 8 close to said pen nib 1 is compatible with people's traditional operating practices, and thus it is easy to operate.

The winding structure 7 is used within said pen body 2 in accordance with the embodiment of the present invention, so that said earphone cord 4 can be easily wrapped around it, to avoid said earphone cord 4 messily wound in said pen body 2 and the occurrence of fracture. In addition, with said winding structure 7, the earplugs 6 can be closely connected to the structure to form a certain tension, so as to prevent said pen cap 3 from accidentally detaching from said pen body 2 and play the role of fixing said pen cap 3.

In addition, said pen cap 3 can also be connected with said rotary screw shaft 9, and it is a threaded connection between said rotary screw shaft 9 and said rotary base 8. During use, said pen cap 3 can be rotated so that said earphone cord 4 is wound around said rotary screw shaft 9. When the assembly and disassembly between said rotary screw shaft 9 and said rotary base 8 is achieved, the assembly and disassembly between said pen cap 3 and said pen body 2 can also be achieved.

In the embodiment of the present invention, it is a plugged connection between said pen cap 3 and said pen body 2. Said pen body 2 is an enclosed penholder, and there is an opening 10 close to said pen cap 3, and said pen cap 3 is provided with step 11. The dimension of the outer circumference of the step 11 on the pen cap 3 matches with the size of the inner wall of the opening 10 and they can work closely together in order to achieve the plugged connection between said pen cap 3 and said pen body 2 easily.

In summary, the above description is only preferred embodiments of the present invention and is not intended to limit the protection scope of the present invention, therefore, any modification, equivalent replacement, or improvement performed within the spirit and the principles of the present invention should be included in the protection scope of the present invention.

INDUSTRIAL APPLICABILITY

The present invention has a simple structure, low production cost, and can be easily standardized and massively produced, and thus it is easy for usage and promotion.

What is claimed is:

1. A mobile terminal handwriting pen, characterized in that said handwriting pen is integrated with an earphone, and said handwriting pen comprises:
   a pen nib, which is an earphone plug;
   a pen body, one end of which is fixedly connected with said pen nib, and the other end of which is movably connected with a pen cap, an earphone cord set in said pen body, and both ends of said earphone cord being respectively connected with earplugs and said earphone plug; and
   the pen cap, which movably cooperates and connects with said pen body, the earplugs being disposed on said pen cap;
   wherein, in said handwriting pen, there is a matched winding structure connected and configured within said pen body for winding said earphone cord; and
   wherein, said winding structure comprises: a rotary base, which is rotatable connected with said pen body; and a rotary screw shaft, which is disposed in said pen body, one end of said rotary screw shaft connected with said rotary base and wound around said earphone cord through threads.

2. The handwriting pen of claim 1, wherein, said rotary base is disposed in said pen body and connected to the end, which is close to said pen nib, of said pen body.

3. The handwriting pen of claim 1, wherein, said pen cap is in a plugged connection with said pen body.

4. The handwriting pen of claim 1, wherein, said pen body is an enclosed penholder.

5. The handwriting pen of claim 1, wherein, said pen cap is connected to said rotary screw shaft, and said rotary screw shaft is connected with said rotary base through threads, and said earphone cord is wound around said rotary screw shaft by rotating said pen cap, and the assembly and disassembly between said pen cap and said pen body is achieved when the assembly and disassembly between said rotary screw shaft and said rotary base is achieved.

6. The handwriting pen of claim 1, wherein, the winding structure is used to tightly connect said earplugs to said winding structure.

7. The handwriting pen of claim 1, wherein, there is an opening at the location where said pen body is near said pen cap, and said pen cap is provided with a step, the dimension of whose outer circumference matches with the size of inner wall of said opening so as to achieve tight fit.

8. The handwriting pen of claim 1, wherein, said mobile terminal is a mobile phone.

\* \* \* \* \*